United States Patent [19]
Moser

[11] Patent Number: 4,492,454
[45] Date of Patent: Jan. 8, 1985

[54] REPROGRAPHY CAMERA

[75] Inventor: Ulrich F. Moser, Siegen, Fed. Rep. of Germany

[73] Assignee: Eurograph Gesellschaft fur Photomechanik mbH, Siegen, Fed. Rep. of Germany

[21] Appl. No.: 449,251

[22] Filed: Dec. 13, 1982

[30] Foreign Application Priority Data

Dec. 19, 1981 [DE] Fed. Rep. of Germany ....... 3150433

[51] Int. Cl.³ ...................... G03B 27/00; G03B 27/52
[52] U.S. Cl. ........................................... 355/1; 355/61
[58] Field of Search ............................... 355/1, 60, 61

[56] References Cited
U.S. PATENT DOCUMENTS 3,476,476 11/1969 Chitayat ................................... 355/1
3,848,996 11/1974 Goding ............................ 355/60 X
4,244,649 1/1981 Rees et al. .............................. 355/61

Primary Examiner—Richard A. Wintercorn
Attorney, Agent, or Firm—Pearne, Gordon, Sessions, McCoy, Granger & Tilberry

[57] ABSTRACT

A camera for reproducing prints or transparencies, known as a reprography camera, is provided with means to emit spots of light on the copy table of the camera. The light spots are produced first in the image platform by light guides which are exposed to a timed light source. A mirror reflects the spots through the lens to the copy table so that when the lens is focused, the longitudinal displacement of the lens will cause a corresponding displacement in the light spots. These light spots illuminate the copy table to show the respective size of a copy and also to indicate the proper position of the original.

5 Claims, 2 Drawing Figures

REPROGRAPHY CAMERA

BACKGROUND OF THE INVENTION

The invention concerns a camera for reproducing prints or transparencies, known as a reprography camera, with a copy table or production table such that longitudinal displacement of the lens results in a change in the size or proportion of the picture. This reprography camera also has a stationary image platform and a mirror which deflects the light path from the copy table to the lens.

The conventional construction of a reprography camera allows the option of producing copies in various predetermined sizes and fixed formats. The size of the resulting copy necessitates a change in the original proportion and this change can only be achieved through an adjustment of the lens in the light path relative to the image platform and the original copy. Although the optical centerpoint remains on the copy table, it does not remain equally so on the image platform as the lens is longitudinally displaced. These points lag even further from each other as the lens is further displaced.

The practical result of this optical lag is that the middle of a copy which is a different size from the original copy must be laterally aligned opposite the middle of the original copy. Since the displacement of the optical middle does not linearly follow a change in the image size, e.g., a lateral displacement of the center of the copy may even produce a reversal point, the copy tables of the prior art are not reliably marked as to how a copy of a determined size must be positioned on the copy table in order to fill the copy area of the image platform as desired.

SUMMARY OF THE INVENTION

The purpose of this invention is to solve this problem, i.e., to indicate the proper copy position on the copy table for each image, size, or proportion.

In accordance with this invention, this problem is solved by providing light-emitting points which are located at the border of the image platform and which are reflected on the copy table by the open lens. The invention utilizes the fact that the lens system, which automatically focuses itself with every image scale, also reflects a back projection from the image platform to the copy table, just as it reflects the copy to the image platform. The projection on the copy table of these vivid points at approximately the corner points of the copy area permits the image scale to be accounted for at the copy surface and thereby to mark the copy table with the copy format which is to be duplicated.

In focusing, the longitudinal displacement of the lens alters the image scale so that the marking points projected onto and from the copy table correspond to defined areas of the copy to be reproduced. The adjustment of the copy between the marking points guarantees that the copy is fully reflected in the copy area of the image platform without overflowing the borders of the copy area.

In accordance with the preferred embodiment of the invention, the light-emitting points are produced using light pipes or light guides. One end of the light pipes is illuminated by a light source and the other end perforates the image platform. It is possible with only one light source, for example, to mark all four corners of the copy area through the back projection on the copy table. Since the lens must be open for the marking and mechanical processes, a time switch is used to turn on the light source for a predetermined time period during which time the lens is open. When this period has elapsed, the lens shuts and the light source is extinguished. The reprography camera is then ready for the copy materials to be inserted and thereafter the copy to be made.

BRIEF DESCRIPTION OF THE DRAWINGS

The drawing schematically illustrates the preferred embodiment of the invention, in which.

DETAILED DESCRIPTION OF THE PREFERRED EMBODIMENT

Figure 1:
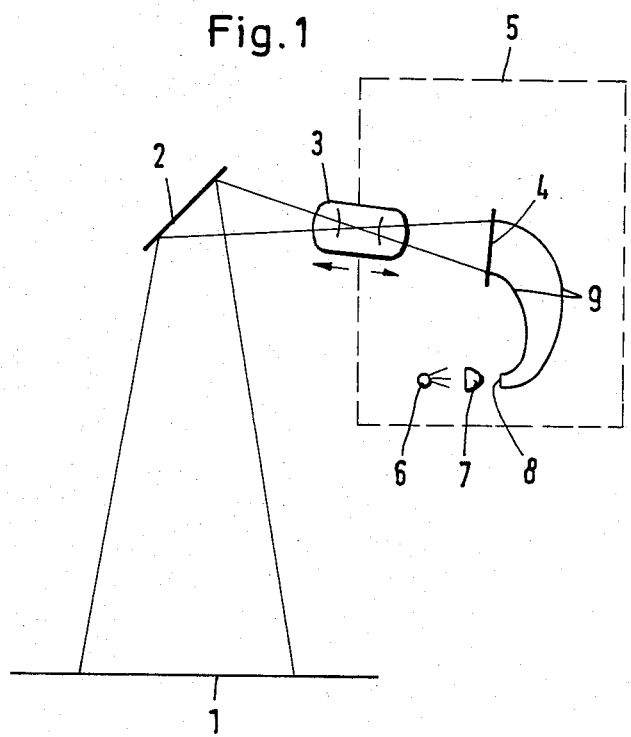
FIG. 1 is a schematic side elevation indicating the relative arrangement of the primary support member of the camera including the device of this invention for the projection of the marking points.

The invention includes a horizontal copy table 1 and a deflecting mirror 2 through which a lens 3 forms an image of the copy within an image platform 4 of the copy table 1. The dashed lines in FIG. 1 imply mechanisms of the camera which are otherwise not represented and also encompassed within a housing 5.

A light source 6 is also found in the housing 5. The light from the source 6 is focused by a nonspherical condenser lens 7 and reflects on the ends 8 of light pipes 9. The other ends of the light pipes 9 are secured in perforations 10 in the image platform 4.

Figure 2:
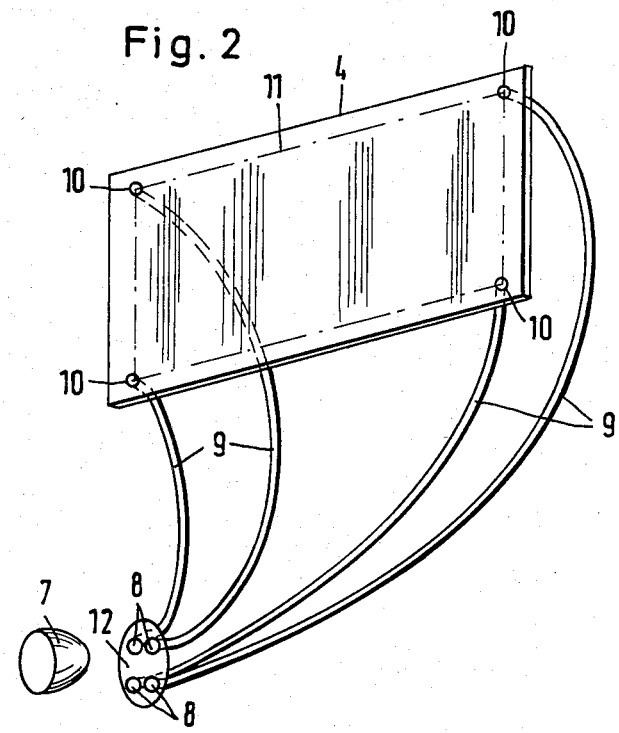
FIG. 2 is a perspective view of the arrangement of the projection and marking device.

The perforations 10 in the image platform 4 thus result in light-emitting points. These light spots are formed on the copy table 1 through counterprojection with the aid of the open lens 3 and the deflection mirror 2. FIG. 2 illustrates that the light spots created by the perforations mark the corners on the copy table 1, thus implying the image area as shown by the broken line in FIG. 2. Thus, for each copy scale which results from the relative position of the lens 3, these light points illuminate the copy table 1 to show the respective size and also the position of the copy so that a full and properly positioned duplicate can be made.

FIG. 2. illustrates that the ends 8 of the light pipes 9 are secured in a disk-shaped holder 12 and are commonly illuminated by the light of light source 6 which is concentrated by the condensor lens 7. Naturally the other ends of the light pipes 9 can be fastened in the perforations 10 in such a way that the light passes from the image platform 4 perpendicular to the image surface 11.

Of course, other measures than the light pipe arrangement may be used to produce the light points provided in the perforations 10, such as decentralized, small incandescent lights with convex lens in the appropriate cases, or laser lights which reflect through the perforations.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A reprography camera comprising
   a copy table;
   a longitudinally displaceable lens such that the longitudinal displacement of the lens results in a change in the image size;
   a stationary image platform having perforations;
   a light source; and
   light guides providing light spots positioned in the peripheral area of the image platform at the four corners of the image platform, each of the light spots being provided by a single light guide; and all of the light guides having a first end which is illuminated by a common light source, and a second end which terminates in one of the perforations in the image platform.

2. A reprography camera as set forth in claim 1, comprising in addition a mirror for the deflection of the course of the image from the copy table to the lens.

3. A reprography camera as set forth in claim 1 wherein said light source is an aspherical light source.

4. A reprography camera as set forth in claim 1 wherein the first ends of said light guides are secured together in a holder.

5. A reprography camera as set forth in claim 1, comprising in addition a time switch which turns on the light source for a predetermined time period during which the lens is open.

* * * * *